(12) United States Patent
Warning

(10) Patent No.: US 7,481,473 B1
(45) Date of Patent: Jan. 27, 2009

(54) STOWABLE SINK FOR A VEHICLE

(75) Inventor: Anthony Warning, Elkhart, IN (US)

(73) Assignee: D & W Incorporated, Elkhart, IN (US)

( * ) Notice: Subject to any disclaimer, the term of this patent is extended or adjusted under 35 U.S.C. 154(b) by 511 days.

(21) Appl. No.: 11/086,621

(22) Filed: Mar. 22, 2005

Related U.S. Application Data

(60) Provisional application No. 60/556,159, filed on Mar. 25, 2004.

(51) Int. Cl.
*B62D 39/00* (2006.01)

(52) U.S. Cl. ............... 296/1.07; 296/156; 296/37.5

(58) Field of Classification Search .......... 296/156, 296/1.07, 1.01, 37.5; 137/355.12
See application file for complete search history.

(56) References Cited

U.S. PATENT DOCUMENTS

| | | | |
|---|---|---|---|
| 140,243 A | | 6/1873 | Byrne |
| 2,867,471 A | | 1/1959 | Coon, Jr. |
| 3,406,999 A | | 10/1968 | Kozicki |
| 3,558,179 A | | 1/1971 | Sonet |
| 3,692,351 A | | 9/1972 | Christopher et al. |
| 4,082,391 A | * | 4/1978 | Turner ............... 312/314 |
| 4,150,861 A | | 4/1979 | Dufrancatel |
| 4,396,222 A | | 8/1983 | Dufrancatel |
| 4,444,429 A | * | 4/1984 | Dawes ............... 296/170 |
| 4,534,601 A | | 8/1985 | Zwick |
| 5,029,935 A | | 7/1991 | Dufrancatel |
| 5,649,734 A | * | 7/1997 | Speis ............... 296/57.1 |
| 5,715,549 A | | 2/1998 | Piontek et al. |
| 5,800,002 A | | 9/1998 | Tiedge et al. |
| 5,813,063 A | | 9/1998 | Watkins et al. |
| 5,862,540 A | | 1/1999 | Chuan |
| 6,098,346 A | | 8/2000 | Miller et al. |
| 6,161,228 A | | 12/2000 | Wietecha |

(Continued)

FOREIGN PATENT DOCUMENTS

DE   4109248 A1   9/1992

OTHER PUBLICATIONS

Fleetwood Folding Trailers, Inc., "Coleman by Fleetwood", Catalog, 1998, 4 pages.

*Primary Examiner*—Jason S Morrow
(74) *Attorney, Agent, or Firm*—Baker & Daniels LLP

(57) ABSTRACT

A sink assembly for use on the outside of a vehicle. The sink assembly may include a mounting frame attached to the exterior of the vehicle and a removable sink top mountable on the mounting frame. The sink top includes a sink bowl with a drain. The sink assembly may also include a sink frame attached to the sink top, wherein the sink frame provides the attachment of the removable sink top to the mounting frame. The sink frame holds the sink top in a generally horizontal position when attached to the mounting frame. The sink assembly may further include a drain hose connected at one end to the drain in the sink bowl. The end of the drain hose opposite to the end connected to the sink bowl includes a fitting for connecting the drain hose to a drain opening in a side of the vehicle. The sink assembly may further include a storage container for storing at least one plumbing apparatus. The plumbing apparatus may include at least one of a flexible faucet, a coiled hose, or a hose with a shower head.

41 Claims, 15 Drawing Sheets

U.S. PATENT DOCUMENTS

| | | |
|---|---|---|
| 6,254,160 B1 | 7/2001 | Marriott et al. |
| 6,817,642 B1 * | 11/2004 | Warning ..................... 296/1.07 |
| 6,962,381 B2 * | 11/2005 | Warning ..................... 296/1.07 |
| 7,172,231 B1 * | 2/2007 | Johnson, II .................. 296/22 |
| 7,201,190 B2 * | 4/2007 | Warning ..................... 137/899 |
| 7,258,390 B2 * | 8/2007 | Fisher et al. ................. 296/168 |
| 2003/0192592 A1 * | 10/2003 | Warning ................ 137/355.12 |
| 2005/0022890 A1 * | 2/2005 | Demchick ................... 137/899 |

\* cited by examiner

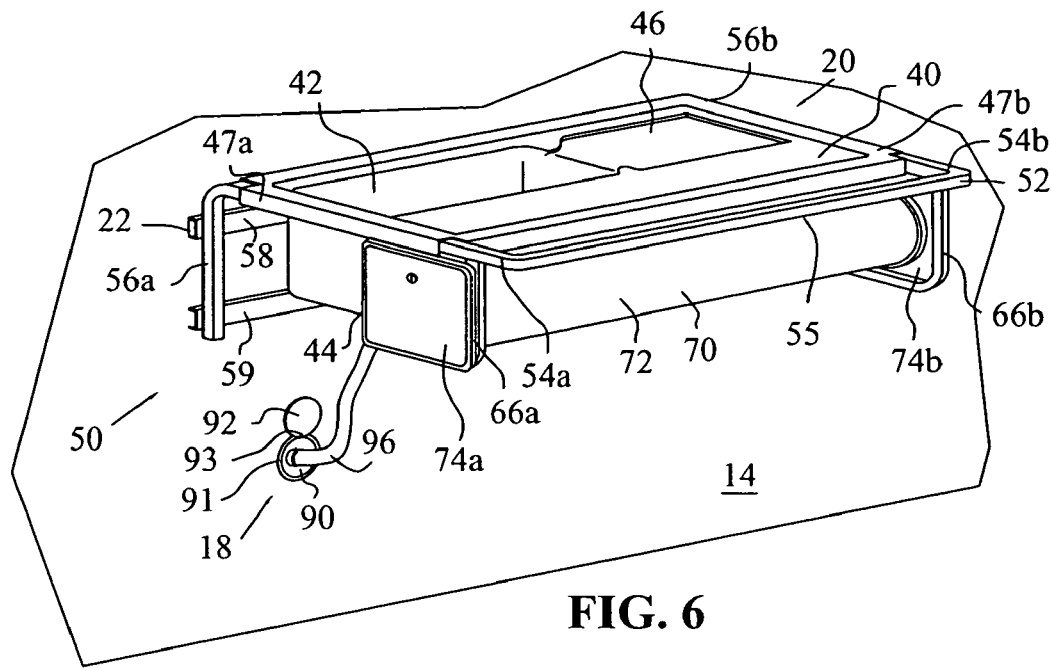
FIG. 6
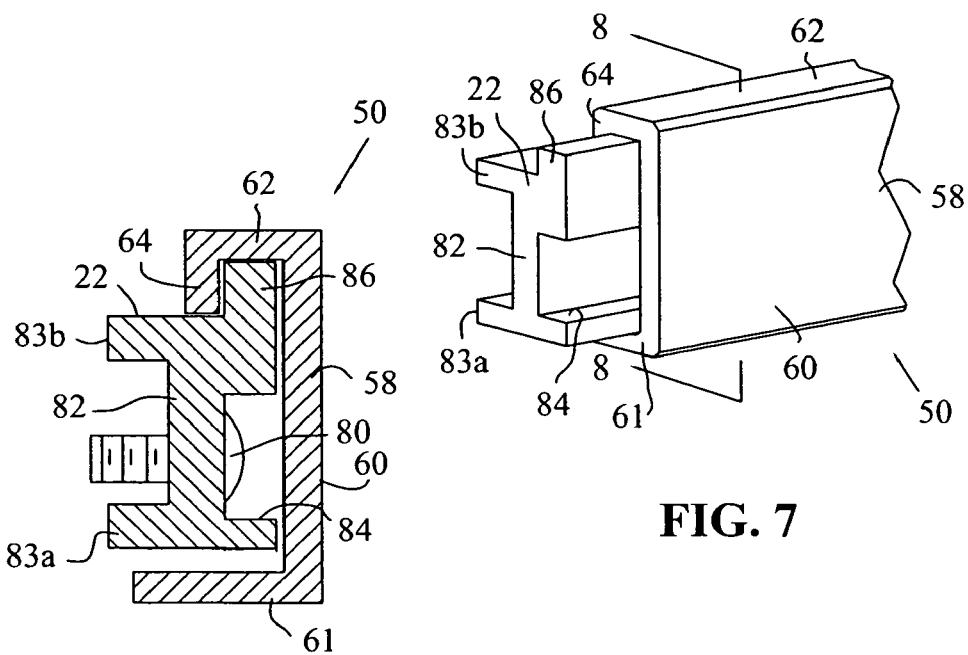
FIG. 7
FIG. 8

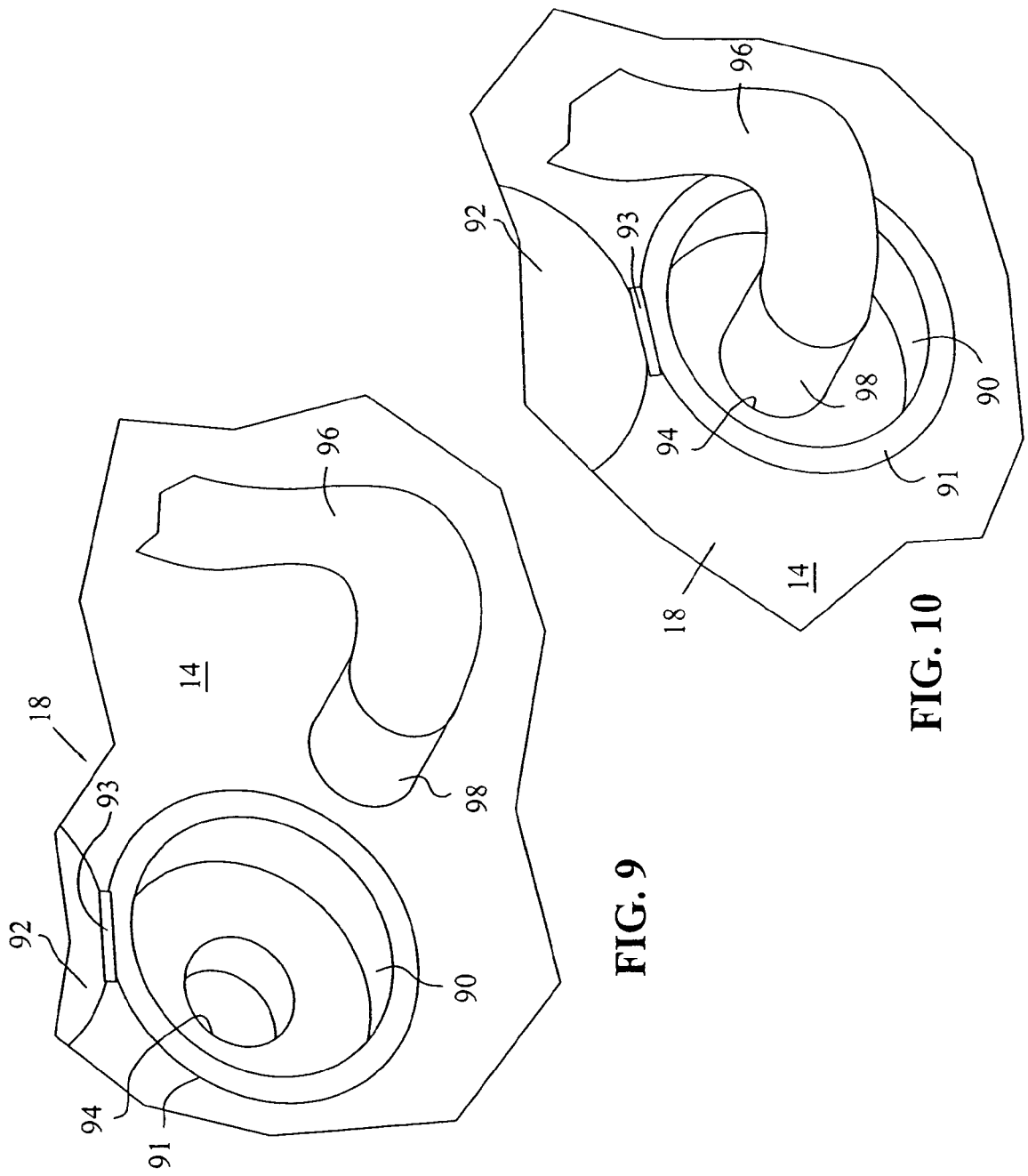

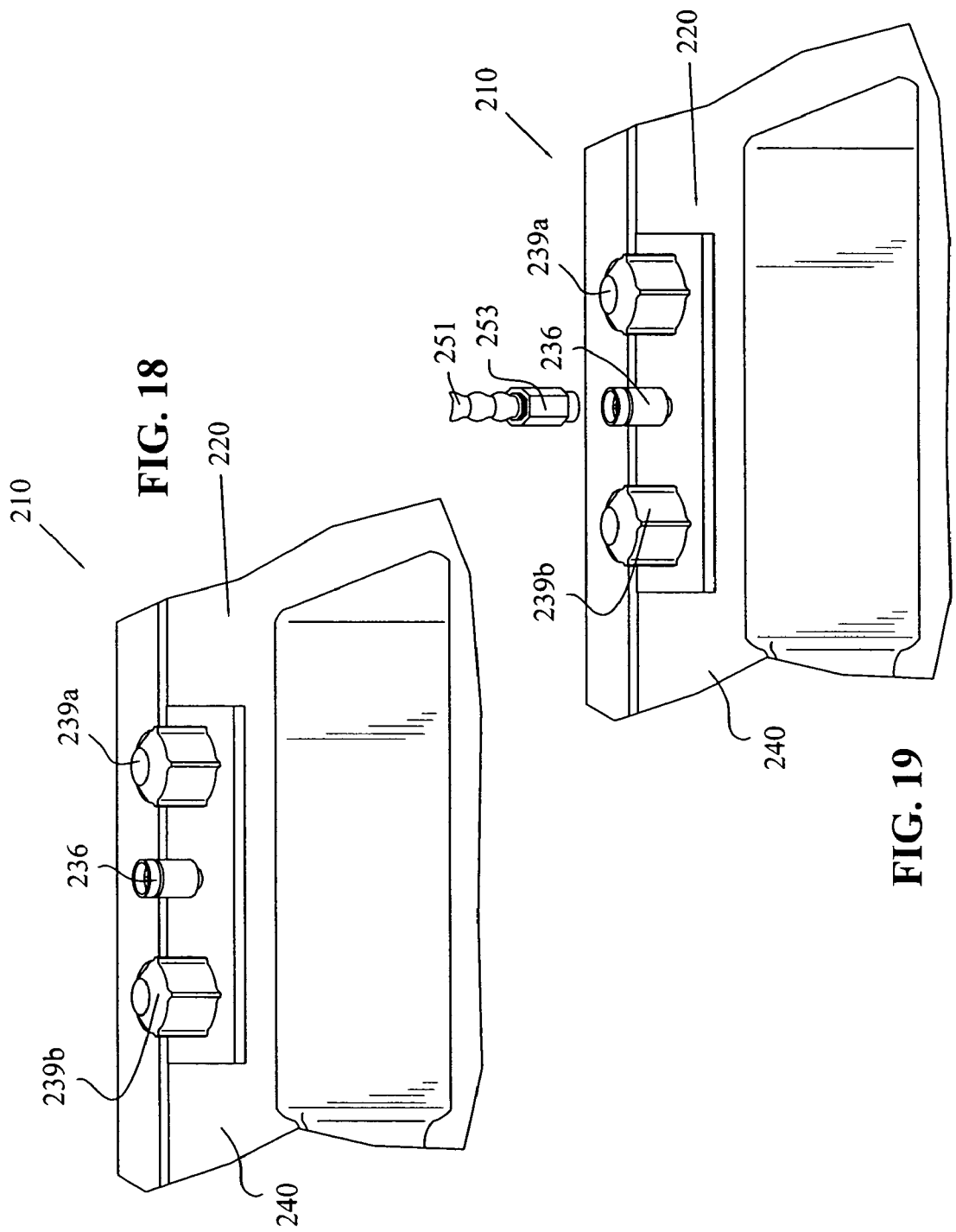

STOWABLE SINK FOR A VEHICLE

This application claims the benefit of U.S. Provisional Patent Application Ser. No. 60/556,159 filed Mar. 25, 2004, the complete disclosure of which is hereby expressly incorporated by reference.

BACKGROUND OF THE INVENTION

This invention relates generally to accessories for recreational vehicles, and in particular, to a removable sink and attachments for use on the outside of a recreational vehicle.

Various types of vehicles are used and sold for recreational purposes and commercial purposes. When referred to herein, recreational vehicles or commercial vehicles shall refer to motor homes, travel trailers, campers and the like, as well as water craft, such as pleasure boats and pontoons. For example, a typical recreational vehicle is shown in U.S. Pat. No. 5,800,002, which is a motor driven style motor home having an interior living area defined by outer walls, including side walls along both sides. Recreational vehicles (RV's) and marine craft carry a supply of fresh water for the convenience of the vehicle occupants while using the vehicle. In addition to internal uses, the user may also require fresh water outside the vehicle for such activities as washing or rinsing the vehicle exterior or washing or rinsing bicycles, scooters or trailered off-road vehicles such as all-terrain vehicles (ATV's) or motorcycles and the like. Depending on the activity being engaged in, the user himself or herself may want to wash his or her hands or rinse off gear, apparel, tools or equipment before re-entering the vehicle. In addition, trailered boats and watercraft benefit from a fresh water rinse after use.

Typically, the user must locate a source of fresh water which often requires that the user drive or trailer the equipment or accessory to a location providing fresh water. In addition to being inconvenient, this allows dirt, foreign matter, or contaminants to dry or otherwise set on the items leaving undesirable deposits that become harder to remove at a later time. This can be particularly troublesome when exposure to salt water or corrosive materials is involved or where immediate fresh water flushing of the accessory after use is recommended.

Furthermore, it would be beneficial if a sink or basin were available for use on the outside of the vehicle with the fresh water supply. This would better facilitate washing hands, articles of clothing or such. It would also be beneficial if the sink contained a drain so that the water from the sink could be drained to a waste or gray water holding tank to prevent puddling and mud around the recreational vehicle. A sink that is permanently mounted to the outside of the vehicle, however, would increase wind resistance, the overall dimensions of the vehicle, and create a hazard that may collide with other objects or vehicles. Accordingly, a need exists for an apparatus that allows the user convenient access to a sink and the on board or other fresh water supply while outside the vehicle, but that can be removed or stowed for travel.

SUMMARY OF THE INVENTION

In one embodiment of the invention, a sink assembly is provided for use on a the outside of a vehicle. The sink assembly may include a mounting frame attached to the exterior of the vehicle and a removable sink top mountable on the mounting frame. The sink top includes a sink bowl with a drain. The sink assembly may also include a sink frame attached to the sink top, wherein the sink frame is removably attachable to the mounting frame, and the sink frame holds the sink top in a generally horizontal position when attached to the mounting frame.

The sink assembly may further include a drain hose connected at one end to the drain in the sink bowl. The end of the drain hose opposite to the end connected to the sink bowl includes a fitting for connecting the drain hose to a drain opening in a side of the vehicle.

The sink assembly may further include a storage container for storing at least one plumbing apparatus. The plumbing apparatus may include at least one of a flexible faucet, a coiled hose, or a hose with a shower head.

The sink assembly as set forth in claim 4, wherein said storage container is located beneath the sink top, when the sink top is mounted in a generally horizontal position to the mounting frame. The storage container may extend in a general horizontal direction when the sink top is mounted in the generally horizontal position.

A portion of the sink frame may hook over the mounting frame.

The sink frame may provide a cantilever support of the sink top. The sink frame may include a support stop to hold the sink top in the generally horizontal position when connected to the mounting frame. The support stop may be configured to buttress against a side wall of the vehicle when the sink top is mounted in the generally horizontal position. The mounting frame may be attached to the side wall of the vehicle, and the support stop may buttress against the side wall at a point that is lower than where the mounting frame is attached.

In another embodiment of the invention, a sink assembly is provided for use on the exterior of a vehicle, wherein the sink assembly includes a water-dispensing device mounted to the vehicle for providing a water supply from a storage tank in the vehicle; a drain opening in the vehicle connected to a gray water holding tank; and a removable sink top having a sink bowl with a drain. The sink top may be mountable in a cantilever manner to a side wall on the exterior of the vehicle in the proximity of the water-dispensing device and the drain opening.

The sink assembly may further include a mounting frame attached to the vehicle for supporting the removable sink top in the cantilever manner. The sink assembly may further include a sink frame attached to the sink top, and the sink frame may be mountable on the mounting frame. A portion of the sink frame may hook over the mounting frame when mounting thereto.

The sink assembly may further include a support stop configured to buttress against a side wall of the vehicle when the sink top is held in the cantilever manner. The sink assembly may further include a mounting frame attached to the side wall of the vehicle for supporting the removable sink top, and the support stop may buttress against the side wall at a point lower than where the mounting frame is attached.

The sink assembly may further include a storage container connected to the removable sink top, and the water-dispensing device may be removable and storable in the storage container. The water-dispensing device may include at least one of a flexible faucet, a coiled hose, or a shower head and hose.

The sink frame may include a towel bar for hanging towels.

In another embodiment of the invention, a sink assembly is provided for use on the exterior of a vehicle, wherein the sink assembly includes a water-dispensing device; a removable sink top mountable to the exterior of the vehicle, the sink top including a sink bowl with a drain; and a mounting means for removably mounting the sink top to the exterior of the vehicle.

The mounting means may be configured to mount and remove the sink top to the exterior of the vehicle without the need for tools.

The mounting means may include a mounting frame attached to a side wall of the vehicle and a sink frame attached to the sink top. A portion of the sink frame may be hangable on the mounting frame.

The mounting means may also include a support stop to hold the sink in a generally horizontal position when mounted to the vehicle.

The water-dispensing device may be mounted to a water hookup located on an exterior side wall of the vehicle.

The sink assembly may further include a storage container for storing the water-dispensing device when not in use.

The sink assembly may further include a drain opening in an exterior side wall of the vehicle for draining water from the sink bowl to a waste water holding tank in the vehicle. The sink assembly may further include a hose having one end connected to the drain in the sink bowl, and another end having a fitting for connecting to the drain opening.

The water-dispensing device may be removably mounted to the sink top. The sink assembly may further include a housing mounted on the vehicle that includes at least one coupling for supplying water to the water-dispensing device. The sink assembly may also include a quick connect coupling for connecting the water-dispensing device to a water supply.

In yet another embodiment of the invention, a vehicle is provided that includes a sink assembly. The vehicle includes side walls, at least one of the side walls may have a mounting frame attached thereto; a water supply system; a waste water holding tank; a water hookup located on the side wall having a mounting frame, which accessible from the exterior of the vehicle; a drain opening with a drain line connected to the waste water holding tank; and a sink top that is removably mountable on the mounting frame, wherein the sink top has a sink bowl with a drain.

The sink top may include at least one water control valve and a coupling for mounting a water-dispensing device thereto. The coupling may be a quick connect coupling.

The vehicle may further include a drain hose connected at one end to the drain in the sink bowl, and the opposite end may have a fitting for connecting to the drain opening.

The vehicle may further include a sink frame attached to the sink top, wherein the sink frame provides the removable attachment of the sink top to the mounting frame. The sink frame may hold the sink top in a generally horizontal position when attached to the mounting frame. The sink frame may include a support stop configured to buttress against the side wall of the vehicle with the mounting frame to enable the sink top to maintain the generally horizontal position.

The vehicle may further include a storage container for storing at least one plumbing apparatus when not in use. The plumbing apparatus may include at least one of a flexible faucet, a coiled hose, or a hose with a shower head. The plumbing apparatus may be connectable to the water hookup for dispensing water.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein:

FIG. 2A is a close-up view of the water hookup and control knobs from the area shown in FIG. 2;

FIG. 6 is a perspective view of the removable sink with a drain hose connected;

FIG. 7 is a close-up showing the frame of the sink mounted to a mounting frame;

FIG. 8 is a cross-sectional view of the sink frame mounted to the mounting frame taken along line 8-8 in FIG. 7;

FIG. 9 is a perspective view of the drain hose for the removable sink prior to connection;

FIG. 10 is a perspective view of the drain hose connected to a drain opening in the vehicle;

FIG. 18 is a perspective view of a quick connect fitting for the faucet of the embodiment of the removable sink in FIG. 15;

FIG. 19 is a perspective view of the faucet ready to be connected to the quick connect fitting for the embodiment of the removable sink of FIG. 15.

Figure 1:
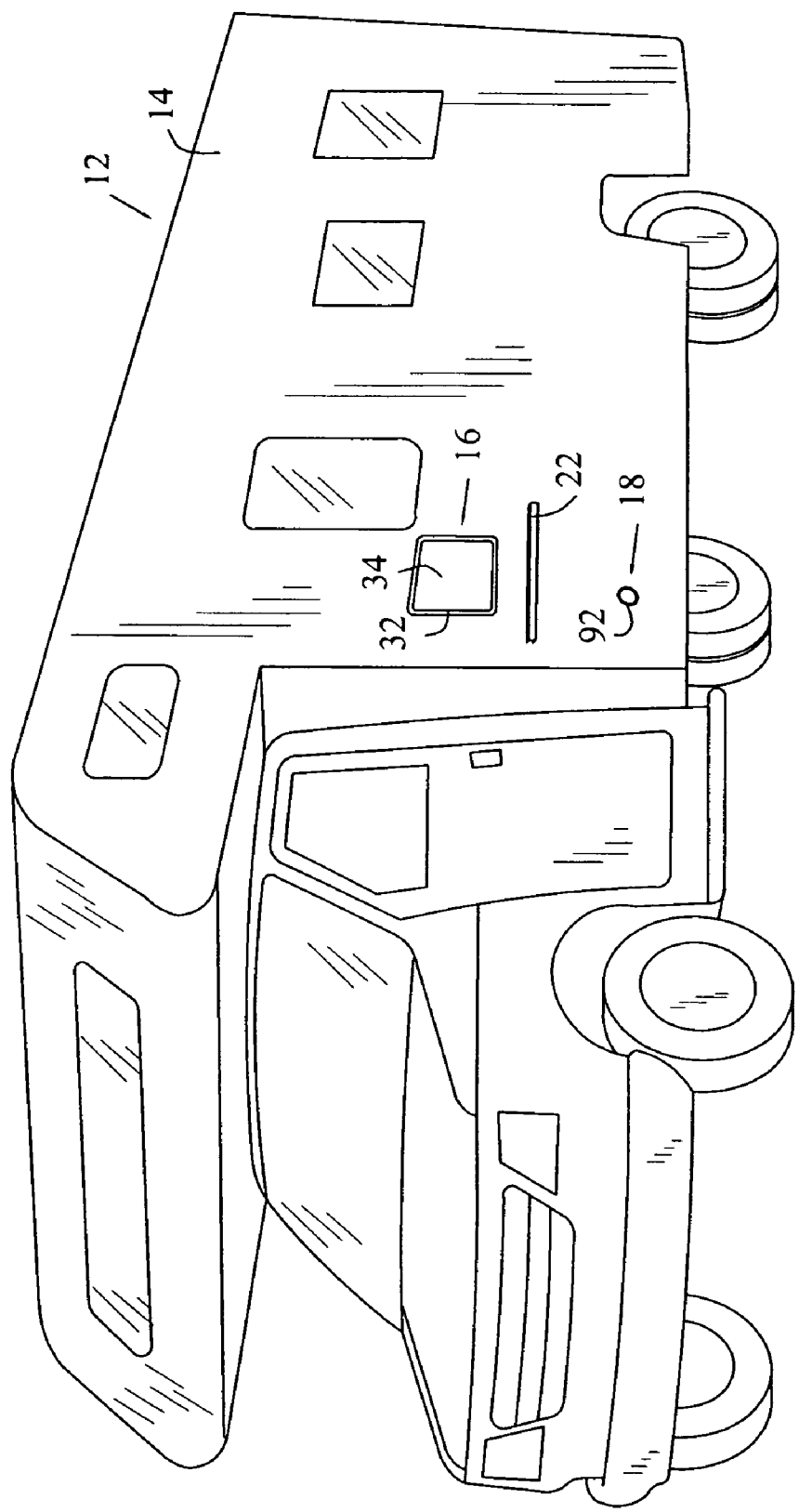
FIG. 1 is a perspective view of a recreational vehicle having a removable sink with the sink shown removed for travel.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

Figure 2:
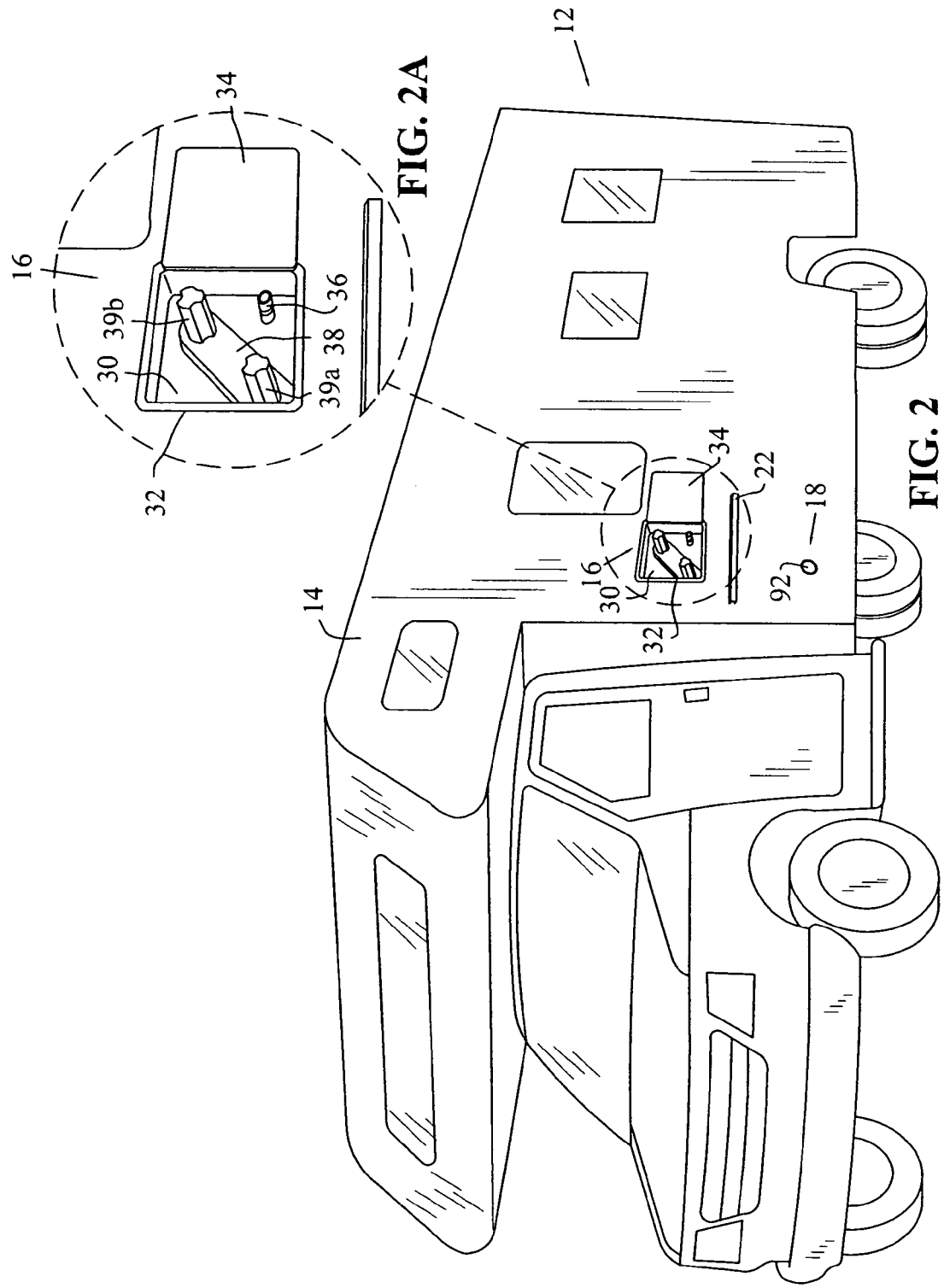
FIG. 2 is a perspective view of the recreational vehicle of FIG. 1 showing a water hookup and control knobs for providing a water supply to the removable sink.
Figure 3:
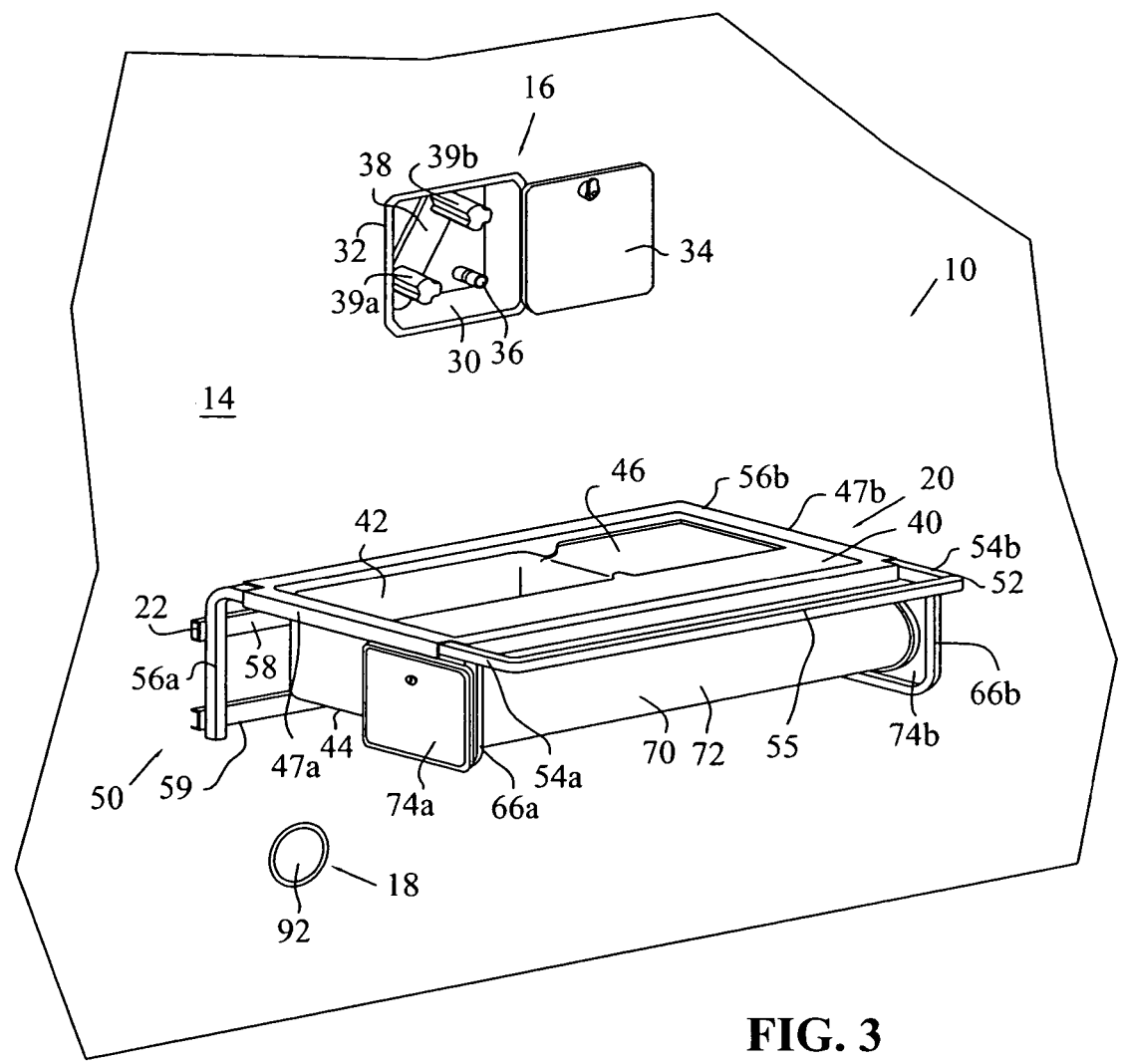
FIG. 3 is a perspective view of the removable sink shown attached to the recreational vehicle in the operational position but without a water-dispensing device or drain hooked up.
Figure 4:
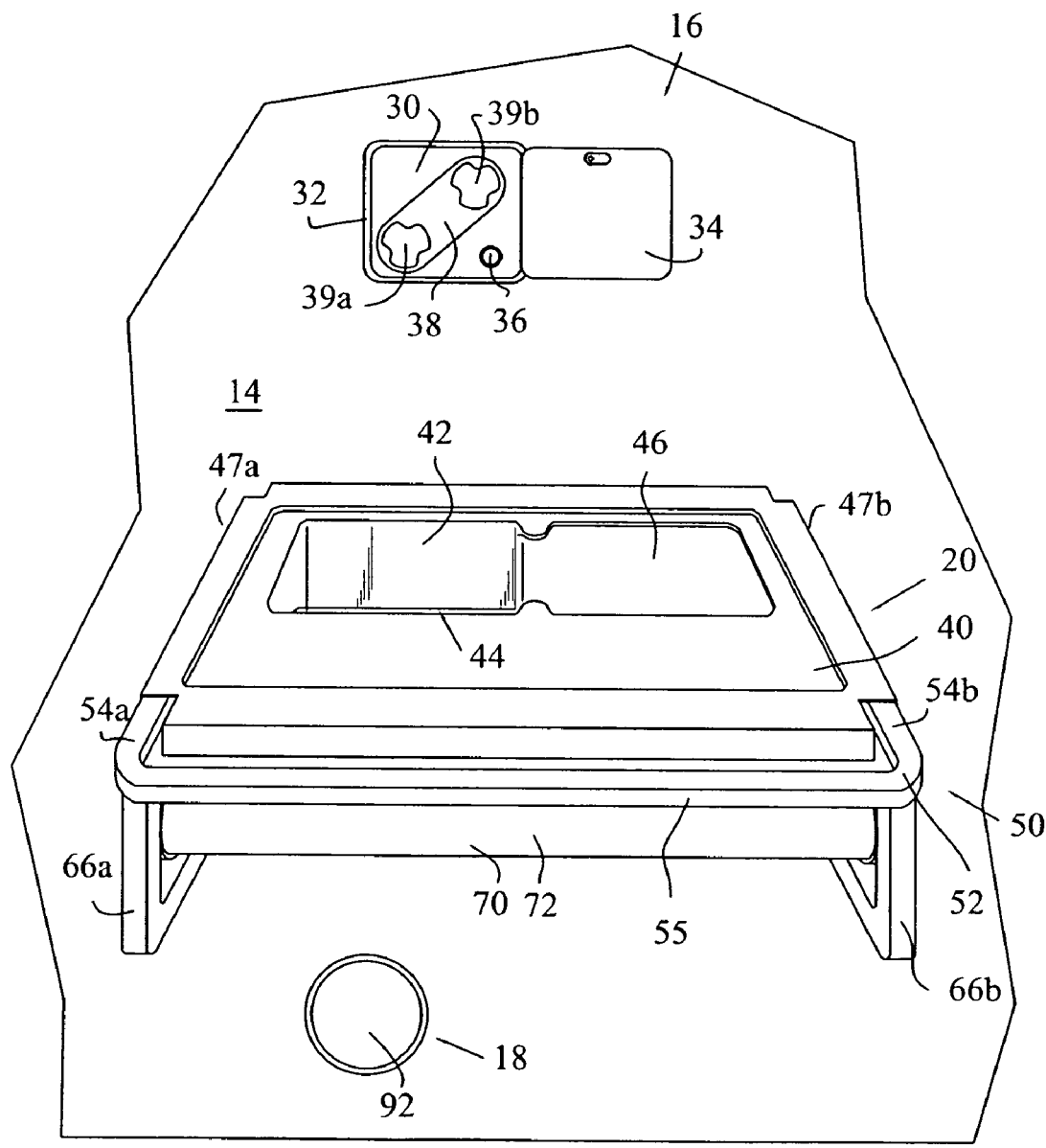
FIG. 4 is a front view of the removable sink in the same stage of assembly as shown in FIG. 3.

With references first to FIGS. 1-3, the invention relates to a removable sink assembly generally indicated as 10 (FIG. 3) that is designed for use on the exterior of a recreational vehicle generally indicated as 12. Recreational vehicle 12 includes a side wall 14, and sink assembly 10 includes a water hookup generally indicated as 16, a drain access generally indicated as 18, a sink top generally indicated as 20, and a mounting frame 22.

As best shown in FIG. 2A, water hookup 16 includes a housing 30 mounted in an aperture 32 in side wall 14, an access door 34, a quick connect coupling 36 connected by a fluid line (not shown) to a fresh water supply tank (not shown) contained in vehicle 12, and a water flow control 38 including hot and cold control valves 39a, 39b, respectively.

Figure 5:
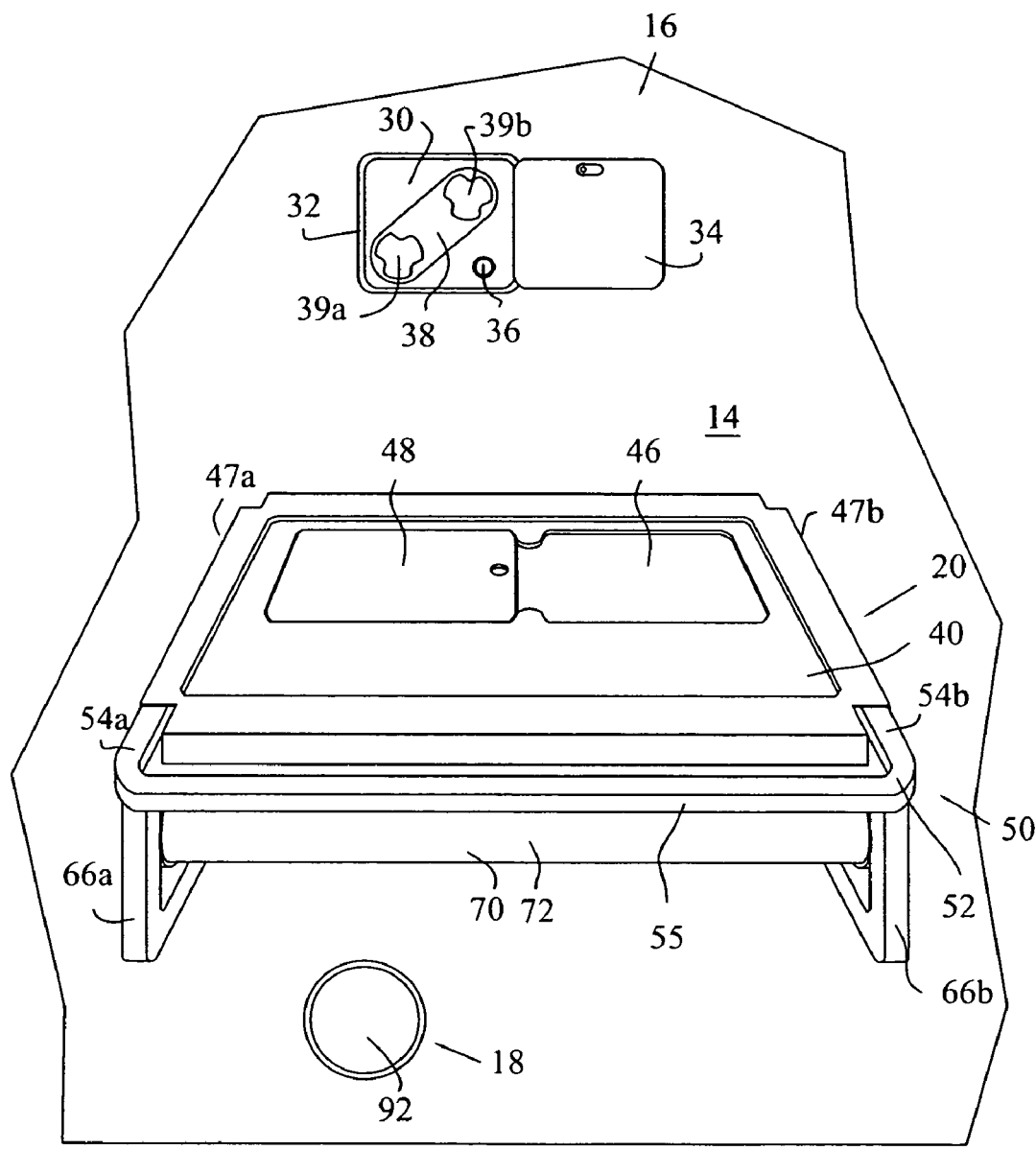
FIG. 5 is a front view of the removable sink with a cover covering the sink bowl.

Referring now to FIGS. 3-6, sink top 20 includes a generally planar surface 40, a sink bowl 42 having a drain 44 at the bottom thereof, a recessed area 46 adjacent sink bowl 42 and support flanges 47a, 47b. A cover 48 may be provided as shown in FIG. 5 to cover sink bowl 42 so that sink top 20 may be used as a utility surface.

In the embodiment shown, a sink frame generally indicated as 50 is attached to sink top 20 to support the sink top when mounted to the exterior of vehicle 12. Sink frame 50 may be manufactured from tubular, rectangular, solid, channel or other known structural members from a metal or other suitably rigid material. Sink frame 50 includes a generally rectangular portion 52 having side members 54a, 54b that are located beneath support flanges 47a, 47b, respectively, of sink top 20 and may be attached thereto using fasteners or adhesives. A front member 55 of rectangular portion 52 can be used as a towel rack for hanging towels (not shown). Extending from rectangular portion 52, sink frame 50 has a pair of vertical members 56a, 56b (vertical member 56b not being visible in the views shown in the drawings). Sink frame 50 also includes a hanging member 58 and a support stop 59, the use of which will be described below. In the embodiment shown, hanging member 58 and support stop 59 are made from C-channel structural members and are welded, bolted or otherwise attached in a known manner to vertical members 56a, 56b in a generally perpendicular direction thereto.

Referring now to FIGS. 7 and 8, hanging member 58 includes a web portion 60, a lower flange 61, an upper flange 62, and lip 64 at the end of and extending from upper flange 62 for hooking on mounting frame 22 as is explained more fully below.

Referring again to FIG. 3, sink frame 50 also includes a pair of storage compartment support members 66a, 66b extending from generally rectangular portion 52. Support members 66a, 66b are welded or otherwise attached using known methods to the rectangular portion. Also connected to sink top 20 is a storage container 70 that is held by storage compartment support members 66a, 66b. In the embodiment shown, storage container 70 includes a generally hollow cylindrical portion 72 and end members 74a, 74b. Either one or both of end members 74a, 74b may be access doors for providing access to storage in the hollow cylinder portion 72.

Referring again to FIGS. 1, 7 and 8, mounting frame 22 is a generally elongate member mounted in a generally horizontal orientation to side wall 14 using screws 80 or other known mounting methods. In the embodiment shown, mounting frame 22 includes a web portion 82, a pair of stand-off legs 83a, 83b extending from web portion 82 and bearing against side wall 14, a longitudinal channel 84, wherein the heads of screws 80 are located, and an upstanding flange 86.

Referring now to FIGS. 6, 9, and 10, drain access 18 includes a generally circular housing 90 located in an aperture 91 in side wall 14, an access door 92 hingeably attached at 93 to housing 90, and a drain opening 94. Drain opening 94 is connected to a waste or gray water tank (not shown) in vehicle 12 with a fluid line (not shown). A drain hose 96 has one end connected to drain 44 in sink bowl 42 and the other end has a fitting 98 for connecting the hose to drain opening 94.

Figure 11:
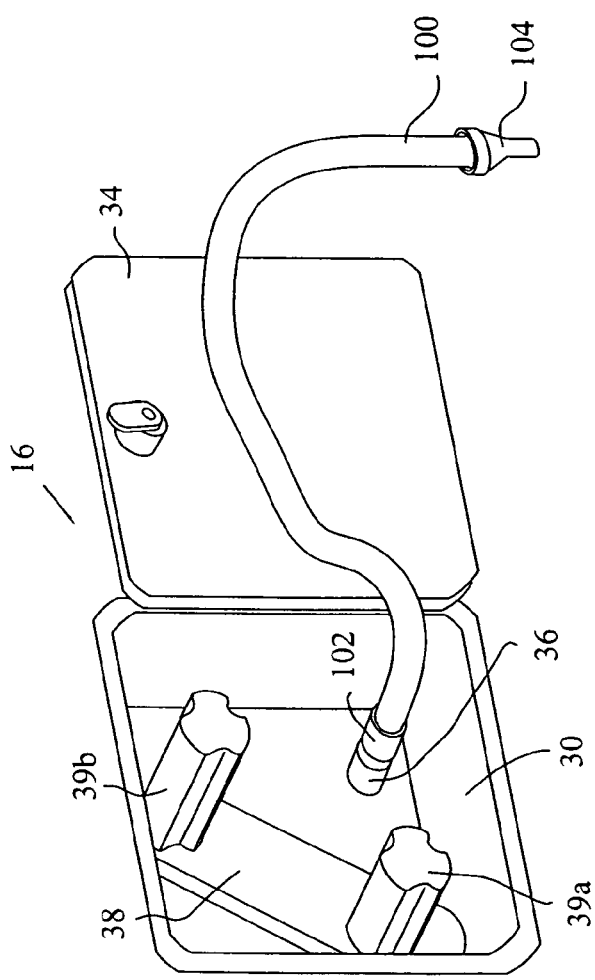
FIG. 11 is a perspective view of a flexible water facet connected to the water hookup.
Figure 12:
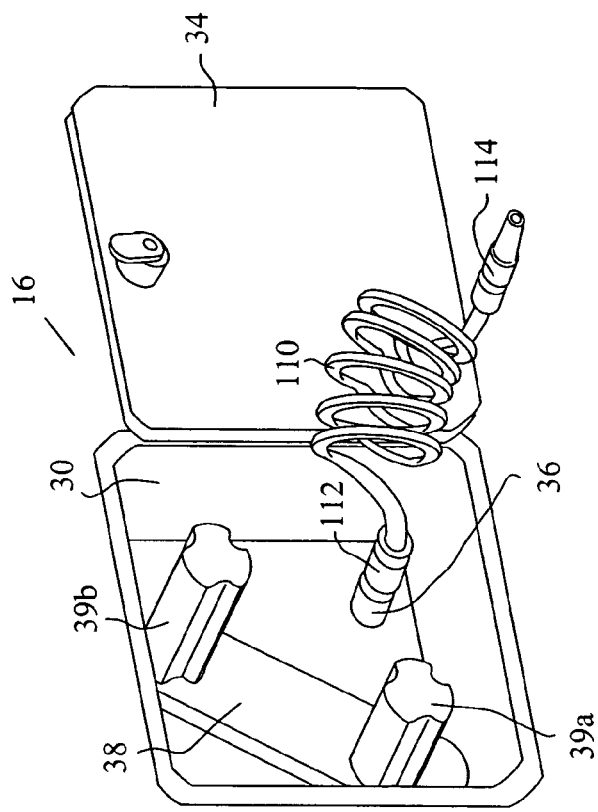
FIG. 12 is a perspective view of a coiled hose connected to the water hookup.
Figure 13:
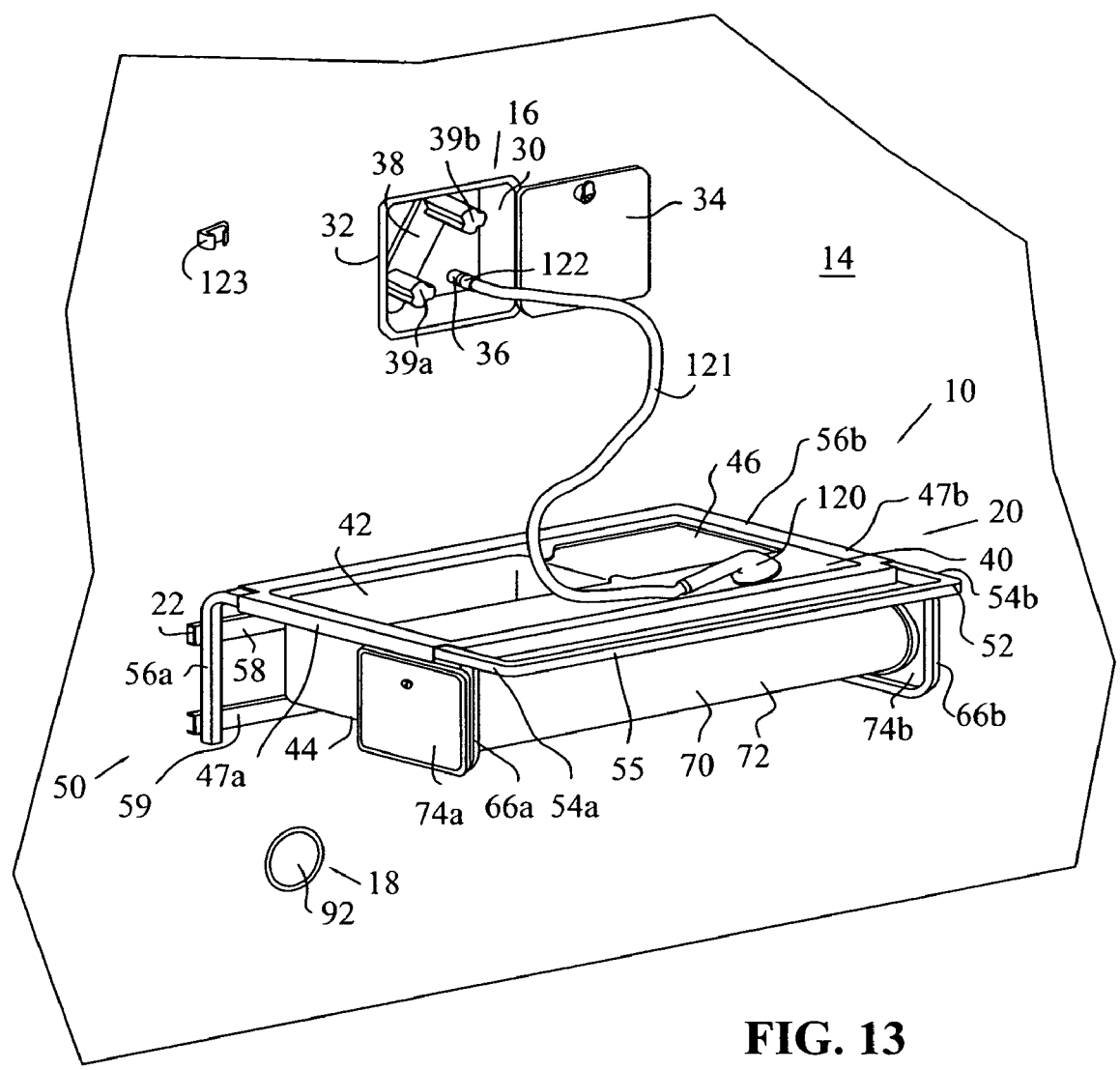
FIG. 13 is a perspective view of a shower head and hose connected to the water hookup.
Figure 14:
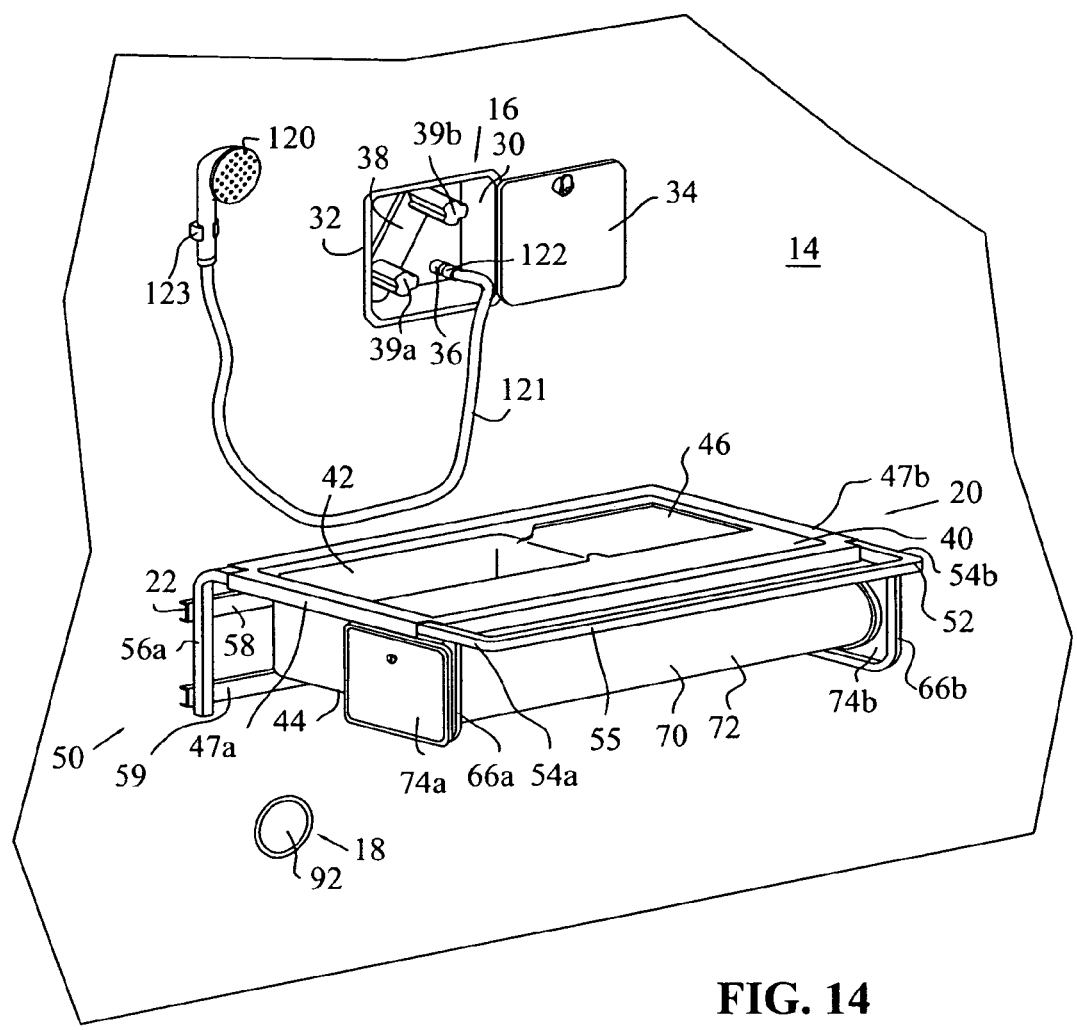
FIG. 14 is a perspective view of the shower head held in a clip.
Figure 15:
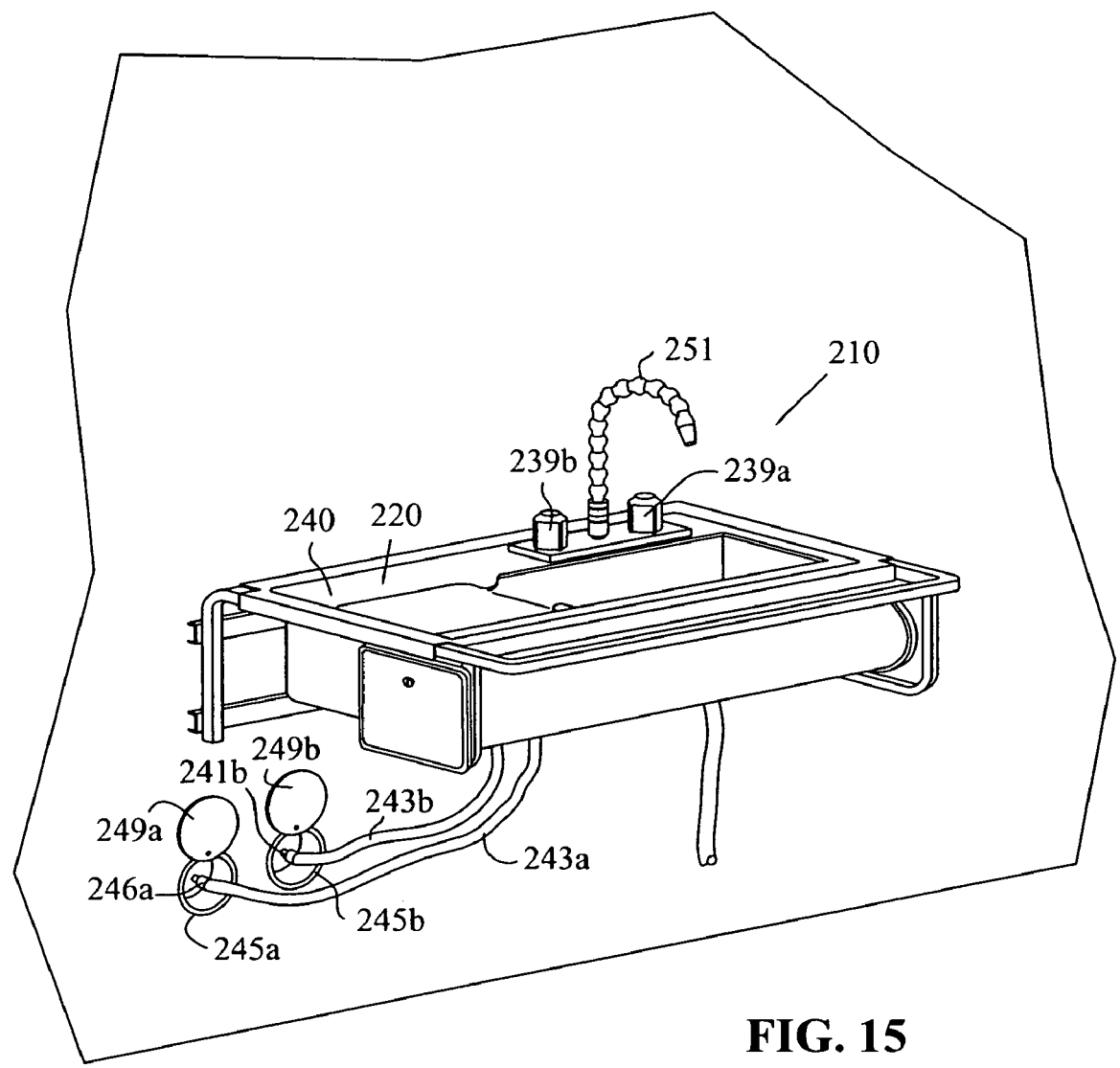
FIG. 15 is a perspective view of another embodiment of a removable sink having a faucet mounted on the sink top.
Figure 16:
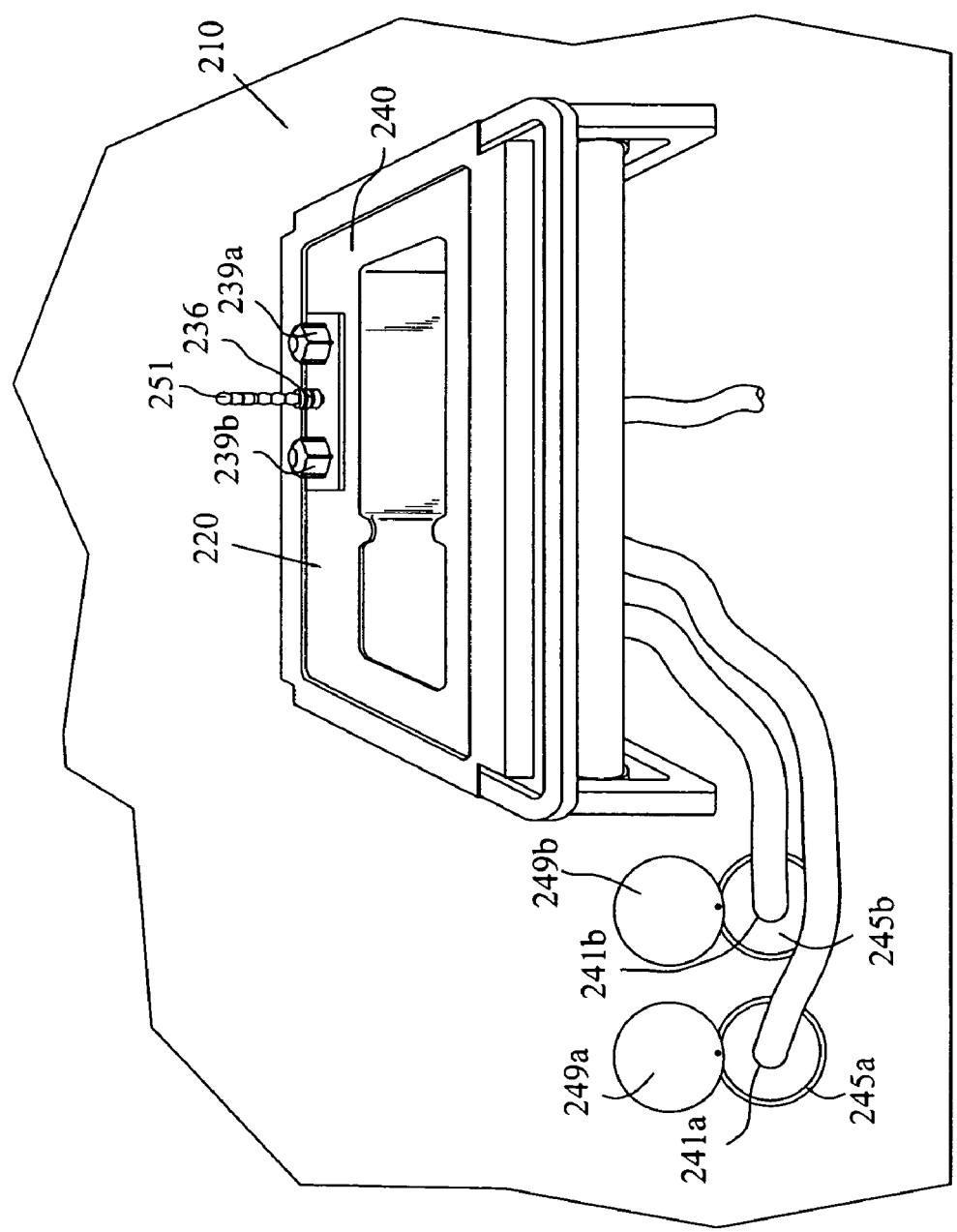
FIG. 16 is a front view of the embodiment of the removable sink of FIG. 15.
Figure 17:
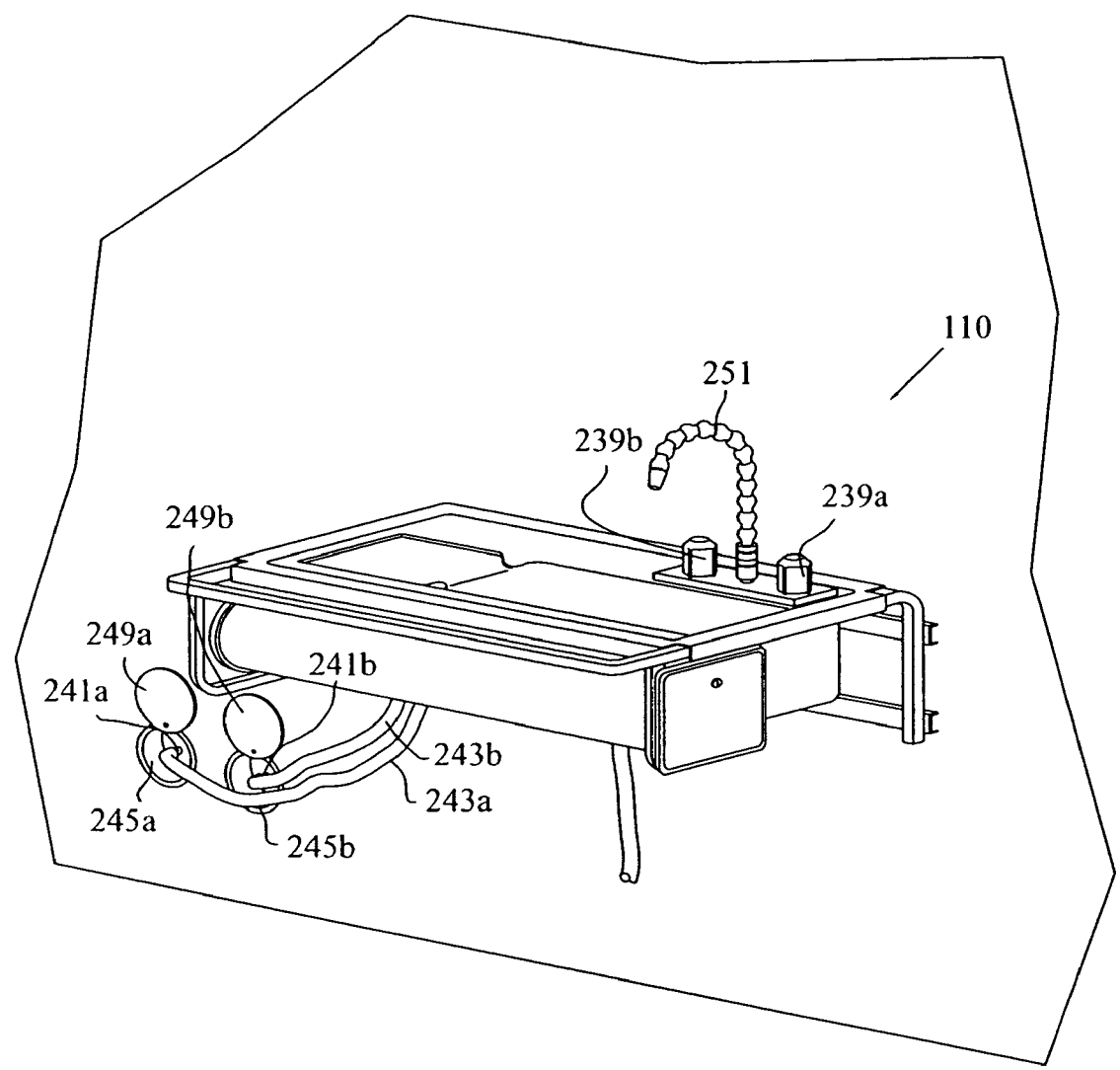
FIG. 17 is another perspective view of the embodiment of the removable sink of FIG. 15.

Numerous plumbing apparatuses or water-dispensing devices may be provided for connection to quick connect coupling 36 in order to provide a water supply for use with sink assembly 10. The water-dispensing devices may include, but are not limited to, a flexible or rigid faucet 100 (FIG. 11) with a coupling 102 for connecting to quick connect coupling 36 and a nozzle 104; a hose 110 (FIG. 12), which may be pre-coiled and includes a coupling 112 for connecting to quick connect coupling 36; and a nozzle 114 that may have a shut-off valve as is common in hose nozzles; and a shower head 120 (FIGS. 13 and 14) attached to a hose 121 and wherein the hose is connectable to quick connect coupling 36 with a coupling 122. A clip 123 that is attached to side wall 14 may be provided to hang shower head 120 when not in use.

Regarding the assembly and use of sink assembly 10, the assembly is shown in the stored or travel position in FIG. 1. In the travel position, sink top 20 is removed from the assembly and stored in a special or standard storage compartment (not shown) in recreational vehicle 12. Access door 34 is closed to protect water hookup 16, as is access door 92 for drain access 18. Mounting frame 22 may be made to be removable during travel, but it is not necessary in the embodiment shown. When it is desired to use sink assembly 10, access doors 34, 92 may be opened to expose the water hookup and drain opening. In addition, sink frame 50 may be hung on mounting frame 22 to support sink top 20. With the embodiment shown, the sink top may be hung without the need or use of any tools and may be installed by tilting the front of sink top 20 upward and positioning lip 64 of hanging member 58 over and around upstanding flange 86 on mounting frame 22. The front of the sink is then lowered so that lower flange 61 on hanging member 58 goes beneath mounting frame 22 and support stop 59 contacts or buttresses against side wall 14 as shown in FIGS. 6-8. In this manner, the weight of sink top 20 and sink frame 50 will be supported by mounting frame 22, and support stop 59 holds sink frame 50 and sink top 20 in a cantilever manner so that planar surface 40 is supported in a generally horizontal position. It should also be realized that in addition to the manner of assembling hanging member 58 onto mounting frame 22 described above, the hanging member may also be slid sideways onto mounting frame 22. For drainage, drain hose 96 is connected at one end to drain 44 in sink bowl 42, and the other end with fitting 98 is connected to drain opening 94 for draining any waste water from sink bowl 42.

Water may be supplied for use with sink top 20 by connecting the desired water-dispensing device (i.e., flexible faucet 100, hose 110, or shower head 120) to quick connect coupling 36. The flow of the water supply from the water-dispensing device may be controlled using water control valves 39a or 39b to provide the desired flow and temperature of water. Any water-dispensing device not being used may be stored in storage container 70 for easy access and to prevent loss.

When it is desired to store the sink for travel, disassembly may be done in the reverse manner of assembly discussed above.

Figure 20:
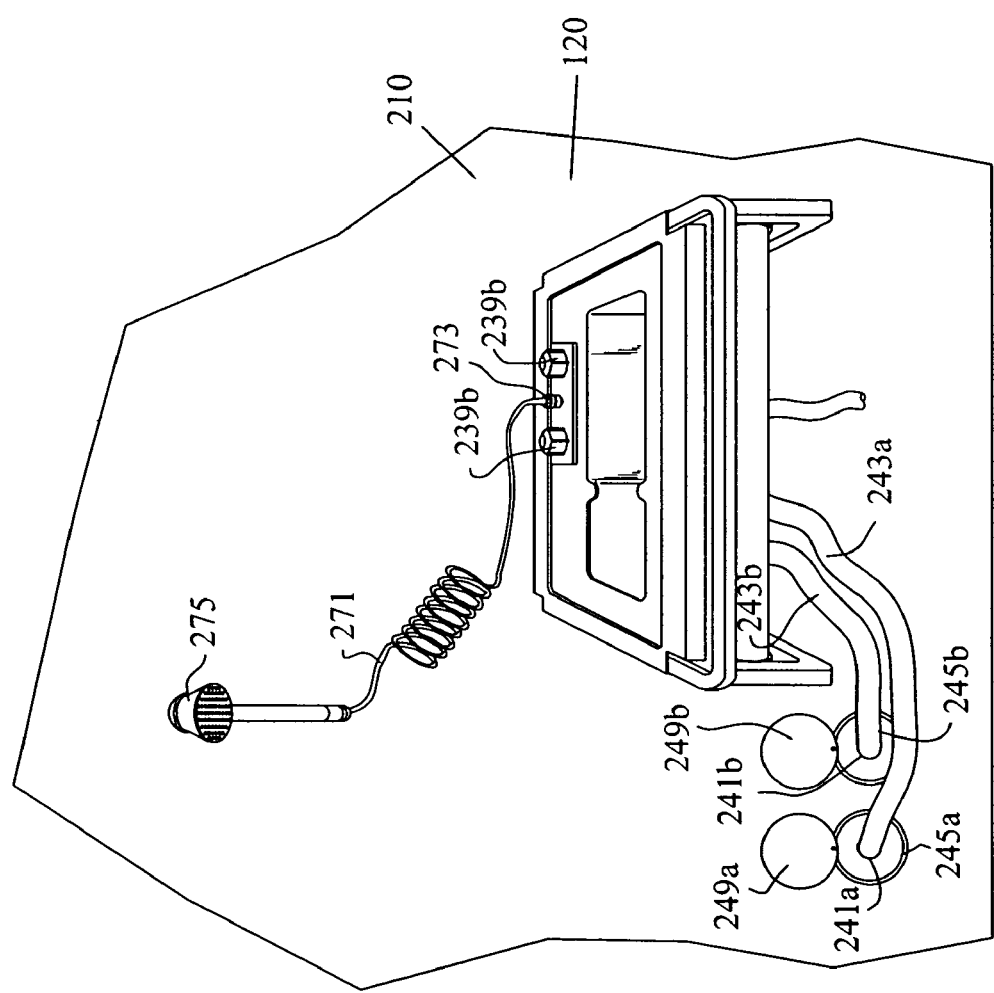
FIG. 20 is a front view of the removable sink of FIG. 15 with the shower hose connected to the quick connect coupling.

Referring now to FIGS. 15-20, another embodiment of a removable sink assembly is generally indicated as 210. Sink assembly 210 is similar to sink assembly 10 and includes a sink top generally indicated as 220. Sink assembly 210, however, also includes a quick connect coupling 236 and water control valves 239a, 239b mounted to a generally planar surface 240 on sink top 220. Water control valves 239a, 239b control water received from couplings 241a, 241b, respectively, to provide hot and cold water to sink assembly 210 from the recreational vehicle's water supply or system. Couplings 241a, 241b are preferably quick connect couplings, but may include other known couplings, such as standard threaded connections. A hose 243a is provided to connect and provide water flow from coupling 241a to water control valve 239a, and a hose 243b is provided to connect and provide water flow from coupling 241b to water control valve 239b. Couplings 241a, 241b may be provided in housings 245a, 245b, respectively, having closable covers 249a, 249b, respectively. A flexible faucet 251 is shown in FIGS. 15-17 and 19 that has a fitting 253 (FIG. 19) that is connectable to quick connect coupling 236. Alternately, a hose 271 having a coupling 273 at one end thereof that is connectable to quick connect coupling 236 and having a shower head 275 at the other end may be provided, as shown in FIG. 20. Otherwise, sink assembly 210 may be attached and removed to the recreational vehicle in a similar manner to sink assembly 10.

While the invention has been taught with specific reference to the above embodiments, one skilled in the art will recognize that changes can be made in form and detail without departing from the spirit and scope of the invention. For example, any desired shape or size of sink top and sink bowl may be used with the present invention. The configurations of the sink frame 50 and mounting frame 22 may also be altered to any configuration that will provide sufficiently rigid support to mount the sink in a generally horizontal position. For instance, mounting frame 22 and hanging member 58 may be substituted with a hook member and mating member having an aperture for receipt of the hook. The sink may also be supported with a locking mechanism or by using screws or bolts to attach the sink or frame.

It should also be realized that as opposed to a separate sink frame, sink frame 50 may be incorporated as a single piece in integral with sink top 20. Support stop 89 may also be replaced by any configuration that will buttress against the side wall of the vehicle or an appendage thereto as long as it will hold the sink in a generally horizontal position. It is also possible to have the support stop incorporated with hanging member 58 and buttress against mounting frame 22 or side wall 14. It should also be realized that any known water-dispensing apparatus may be substituted for those disclosed and that any known plumbing connection may be substituted for quick connect coupling 36. As such, the described embodiments are to be considered in all respects only as illustrative and not restrictive. The scope of the invention is, therefore, indicated by the claims that follow rather than by the description or drawings.

What is claimed is:

1. A sink assembly for use on the exterior of a vehicle, said sink assembly comprising:
    a mounting frame attached on the exterior of the vehicle;
    a removable sink top mountable on said mounting frame, said sink top having a sink bowl with a drain; and
    a sink frame attached to said sink top, said sink frame providing the removable attachment of said sink top to said mounting frame, and said sink frame holding said sink top in a generally horizontal position when attached to said mounting frame.

2. The sink assembly as set forth in claim 1, further including a drain hose connected at one end to said drain in said sink bowl.

3. The sink assembly as set forth in claim 2, wherein the end of said drain hose opposite to said end connected to said sink bowl includes a fitting for connecting said drain hose to a drain opening in a side wall of the vehicle.

4. The sink assembly as set forth in claim 1, further including a storage container for storing at least one plumbing apparatus.

5. The sink assembly as set forth in claim 4, wherein said plumbing apparatus includes at least one of a flexible faucet, a coiled hose, or a hose with a shower head.

6. The sink assembly as set forth in claim 4, wherein said storage container is located beneath said sink top when said sink top is mounted in a generally horizontal position to said mounting frame.

7. The sink assembly as set forth in claim 6, wherein said storage container extends in a general horizontal direction when said sink top is mounted in the generally horizontal position.

8. The sink assembly as set forth in claim 1, wherein a portion of said sink frame hooks over said mounting frame.

9. The sink assembly as set forth in claim 1, wherein said sink frame provides a cantilever support to said sink top.

10. The sink assembly as set forth in claim 9, wherein said sink frame includes a support stop to hold said sink top in the generally horizontal position when connected to said mounting frame.

11. The sink assembly as set forth in claim 10, wherein said support stop is configured to buttress against a side wall of the vehicle when said sink top is mounted in the generally horizontal position.

12. The sink assembly as set forth in claim 11, wherein said mounting frame is attached to the side wall of the vehicle, and said support stop buttresses against the side wall at a point that is lower than where said mounting frame is attached.

13. A sink assembly for use on the exterior of a vehicle, the sink assembly comprising:
    a water-dispensing device mounted to the vehicle for providing a water supply from a storage tank in the vehicle;
    a drain opening in the vehicle connected to a waste water holding tank; and
    a removable sink top having a sink bowl with a drain, said sink top being mountable in a cantilever manner to a side wall on the exterior of the vehicle in the proximity of said water-dispensing device and said drain opening.

14. The sink assembly as set forth in claim 13, further including a mounting frame attached to the vehicle for supporting said removable sink top in the cantilever manner.

15. The sink assembly as set forth in claim 14, further including a sink frame attached to said sink top, said sink frame being mountable on said mounting frame.

16. The sink assembly as set forth in claim 15, wherein a portion of said sink frame hooks over said mounting frame when mounted thereto.

17. The sink assembly as set forth in claim 13, further including a support stop configured to buttress against a side wall of the vehicle when said sink top is held in the cantilever manner.

18. The sink assembly as set forth in claim 17, further including a mounting frame attached to the side wall of the vehicle for supporting said removable sink top, and said support stop buttresses against the side wall at a point that is lower than where said mounting frame is attached.

19. The sink assembly as set forth in claim 13, further including a storage container connected to said removable sink top, and said water-dispensing device is removable and storable in said storage container.

20. The sink assembly as set forth in claim 19, wherein said water-dispensing device includes at least one of a flexible faucet, a coiled hose, or a shower head and hose.

21. The sink assembly as set forth in claim 15, wherein said sink frame includes a towel bar for hanging towels.

22. A sink assembly for use on the exterior of a vehicle, said sink assembly comprising:
   a water-dispensing device;
   a removable sink top mountable to the exterior of the vehicle, said sink top including a sink bowl with a drain; and
   a mounting means for removably mounting said sink top to the exterior of the vehicle, said mounting means configured to mount and remove said sink top to the exterior of the vehicle in a hanging fashion without using tools or fasteners.

23. The sink assembly as set forth in claim 22, wherein said mounting means includes a mounting frame attached to a side wall of the vehicle and a sink frame attached to said sink top.

24. The sink assembly as set forth in claim 23, wherein a portion of said sink frame is hangable on said mounting frame.

25. The sink assembly as set forth in claim 22, wherein said mounting means includes a support stop to hold the sink in a generally horizontal position when mounted to the vehicle.

26. The sink assembly as set forth in claim 22, further including a storage container for storing said water-dispensing device when not in use.

27. The sink assembly as set forth in claim 22, further including a drain opening in an exterior side wall of the vehicle for draining water from the sink bowl to a waste water holding tank in the vehicle.

28. The sink assembly as set forth in claim 27, further including a hose having one end connected to said drain in said sink bowl, and another end having a fitting for connecting to said drain opening.

29. The sink assembly as set forth in claim 22, wherein said water-dispensing device is removably mounted to said sink top.

30. The sink assembly as set forth in claim 29, including a housing mounted on the vehicle with at least one coupling for supplying water to said water-dispensing device.

31. The sink assembly as set forth in claim 30, including a quick connect coupling for connecting said water-dispensing device to a water supply.

32. A vehicle including a sink assembly comprising:
   vehicle side walls, at least one of said side walls having a mounting frame attached thereto;
   a water supply system;
   a waste water holding tank;
   a water hookup located on the side wall having a mounting frame, said water hookup accessible from the exterior of the vehicle;
   a drain opening with a drain line connected to said waste water holding tank; and
   a sink top that is removably mountable on said mounting frame, said sink top having a sink bowl with a drain.

33. The vehicle including a sink assembly as set forth in claim 32, wherein said sink top includes at least one water control valve and a coupling for mounting a water-dispensing device thereto.

34. The vehicle including a sink assembly as set forth in claim 33, wherein said coupling is a quick connect coupling.

35. The vehicle as set forth in claim 32, including a drain hose connected at one end to said drain in said sink bowl, and the opposite end includes a fitting for connecting to said drain opening.

36. The vehicle as set forth in claim 32, further including a sink frame attached to said sink top, said sink frame providing the removable attachment of said sink top to said mounting frame.

37. The vehicle as set forth in claim 36, wherein said sink frame holds said sink top in a generally horizontal position when attached to said mounting frame.

38. The vehicle as set forth in claim 37, wherein said sink frame includes a support stop configured to buttress against a side wall of the vehicle to enable said sink top to maintain the generally horizontal position.

39. The vehicle as set forth in claim 32, further including a storage container for storing at least one plumbing apparatus when not in use.

40. The vehicle as set forth in claim 39, wherein said plumbing apparatus includes at least one of a flexible faucet, a coil hose, or a hose with a shower head.

41. The vehicle as set forth in claim 39, wherein said plumbing apparatus is connectable to said water hookup for dispensing water.

* * * * *